Patented Apr. 30, 1935

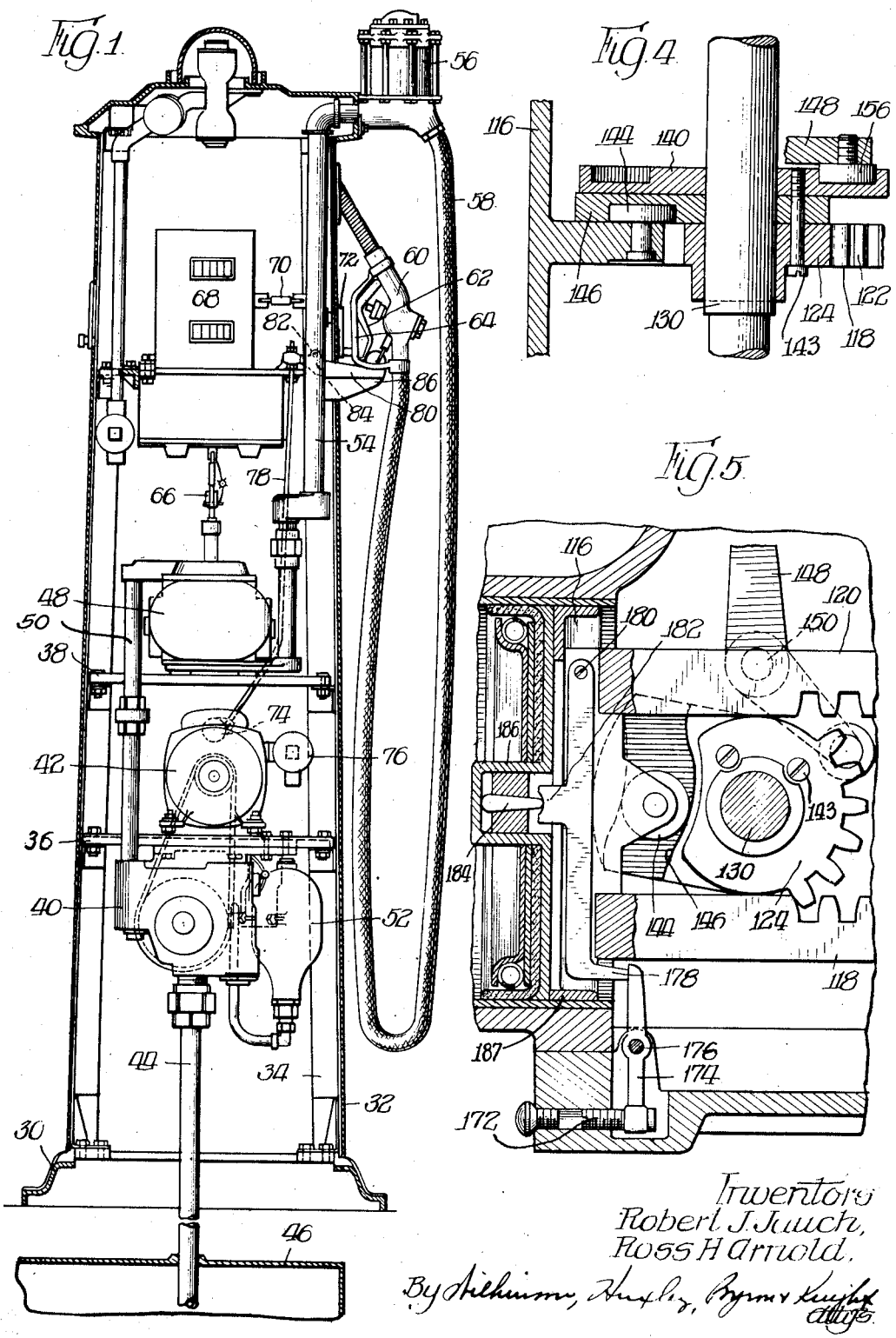

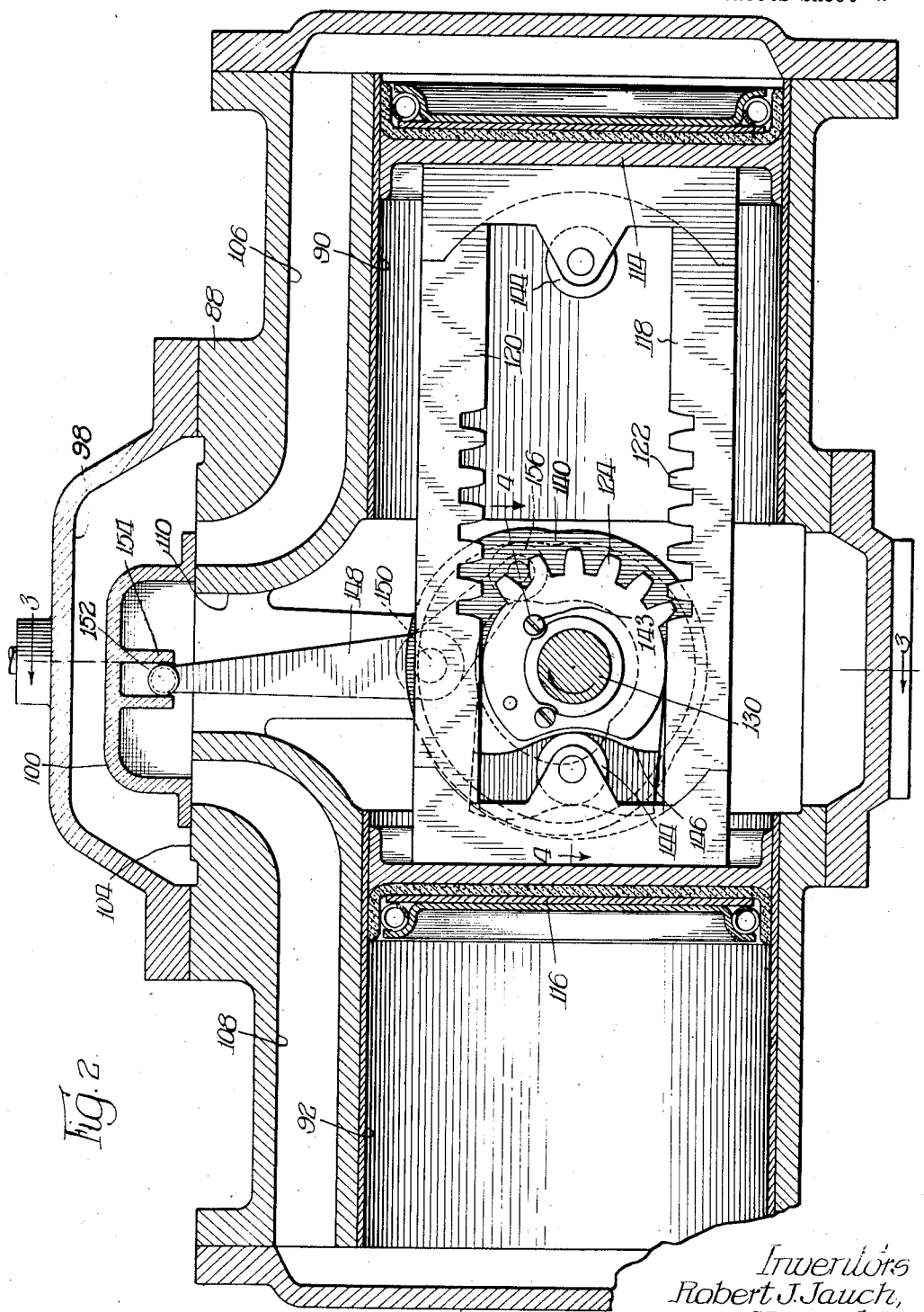

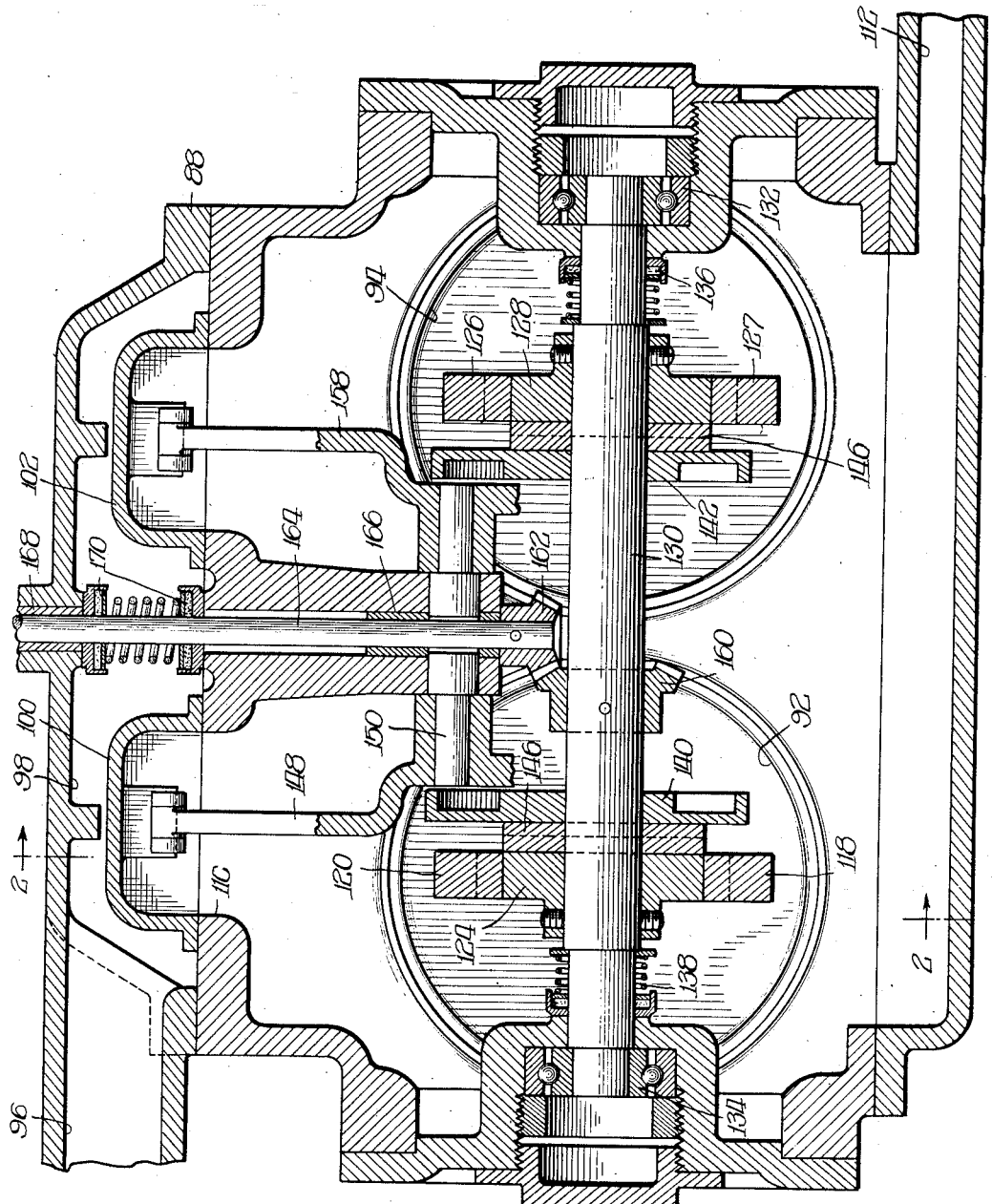

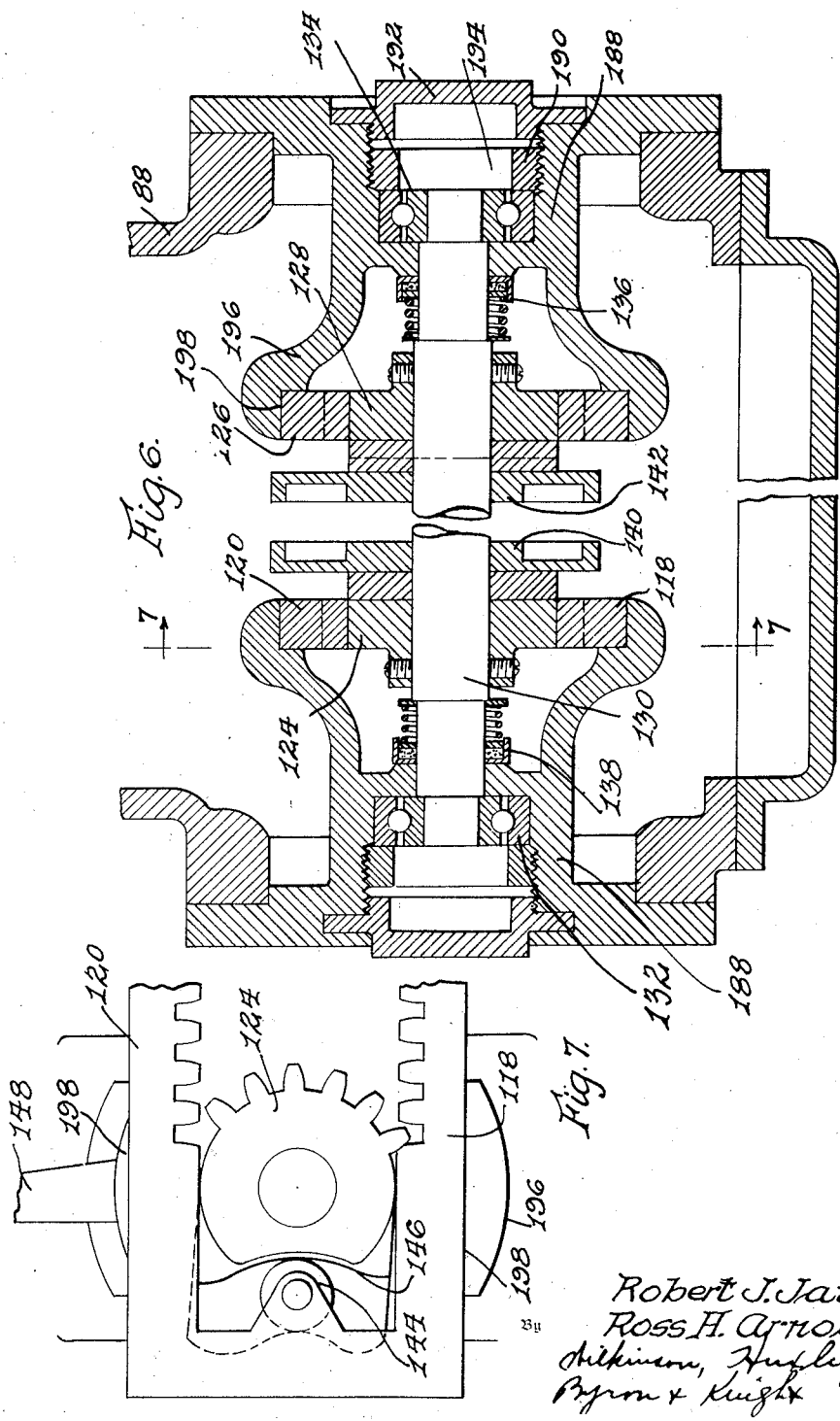

1,999,362

UNITED STATES PATENT OFFICE 1,999,362

METER FOR LIQUID DISPENSING APPARATUS

Robert J. Jauch and Ross H. Arnold, Fort Wayne, Ind., assignors to Wayne Company, Fort Wayne, Ind., a corporation of Indiana Application April 26, 1933, Serial No. 668,111

11 Claims. (Cl. 73—30)

This invention relates to a meter for a liquid dispensing apparatus wherein a plurality of cylinders are disposed to operate a registering device at a constant speed.

A further object is to provide a meter of the reciprocating type for a liquid dispensing apparatus wherein the control valve is operated to cause the liquid to pass through the meter at a constant rate.

A yet further object is to provide a meter of the reciprocating type for liquid dispensing apparatus wherein the control valve is of the reciprocating type in which there is no dead center condition prevailing.

A still further object is to provide a meter which is inexpensive to manufacture and maintain and fulfills all requirements of manufacture and service.

Another further object is to provide a meter adapted particularly for a liquid dispensing apparatus wherein a rack and gear connection is interposed between the pistons and the control valve, the rack and gear being so arranged that the gear is always driven at its pitch circle and there is never a condition existing similar to the dead center position of crank motion.

A different object is to provide seal rings in the fluid meter for preventing leakage of fluid in the meter and wherein the fluid is positively kept from the bearings.

A still different object is to provide a meter for a liquid dispensing apparatus wherein the weight of the associated parts is removed from the cylinder walls.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a sectional elevation of a liquid dispensing apparatus embodying the invention;

Figure 2 is a longitudinal sectional elevation through the meter of the liquid dispensing apparatus, the same being taken substantially in the plane as indicated by the line 2—2 of Figure 3;

Figure 3 is a transverse sectional elevation through the meter shown in Figure 2, the same being taken substantially in the plane indicated by the line 3—3 of Figure 2;

Figure 4 is a fragmentary sectional plan view taken substantially in the plane as indicated by the line 4—4 of Figure 2;

Figure 5 is a fragmentary sectional elevation corresponding to Figure 2 showing the piston adjustment for calibrating the meter;

Figure 6 is a transverse fragmentary sectional elevation through the meter housing showing a modification thereof, the same corresponding to the view shown in Figure 3;

Figure 7 is a fragmentary sectional elevation taken substantially in the plane as indicated by the line 7—7 of Figure 6.

Referring first of all more particularly to Figure 1, the liquid dispensing apparatus consists essentially of the base 30 adapted to support the casing 32, the framing 34 within the casing being provided with the platforms 36 and 38, the platform 36 being adapted to support a pump 40 and the motor 42 which is operatively connected to said pump. The suction side of the pump is connected through the pipe 44 to the source of liquid supply 46, and upon operation is adapted to draw the liquid from the source of supply 46 and supply it to the inlet side of the meter 48 through the pipe 50. An expansion chamber 52 may be provided associated with the pump for taking care of any expansion in the liquid dispensing apparatus. The outlet side of the meter 48 is connected through the pipe 54 to the sight gauge 56 to which the hose 58 is connected, the end of the hose being provided with the nozzle valve 60 having the operating handle 62 and the guard 64 associated therewith. The meter 48 is provided with the rotating shaft 66 controlled by suitable pistons provided in the meter, the shaft being connected to registering and computing mechanism 68 as illustrated in Patent No. 1,888,533. The registering mechanism is adapted to be reset by means of the shaft 70 controlled by the reset handle 72. The operation of the motor 42 is controlled by a suitable electric switch 74 interposed in the current conduit 76, the switch being controlled by the link 78 connected to the switch operating arm 80, said arm being pivoted as at 82 to the interlocking mechanism housing 84. The switch operating arm 80 is associated with the nozzle support 86 secured to the housing 84, the housing 84 being adapted to be secured to the framing 34 in the casing 32.

Referring now more particularly to the construction of the meter, it consists essentially of the casing 88 provided with a pair of aligned cylinders 90 and 92 disposed adjacent another pair of similar cylinders, one of which is shown at 94 in Figure 3. As each pair of aligned cylinders is similar, it will be necessary to describe only one of said pairs of cylinders. The casing 88 is provided with the inlet passage 96 to which the pipe 50 is in communication, the inlet passage being in communication with the valve chamber 98. Reciprocating valves 100 and 102 are provided in said valve chamber, said valves controlling the respective inlet ports and outlet portions of the aligned cylinders. More particularly, the valve 100 is slidably seated on the seat 104 and reciprocates to control the passages 106 and 108 communicating with the outer ends of the cylinders 90 and 92, and said valve is adapted to control communication between the passages 106 and 108 and the outlet passage 110 communicating with the outlet 112 of the casing 88, the outlet 112 being connected to the discharge pipe 54. It is understood, of course, that the valve 102 controls similar passages to each end of the cylinders which it controls and also controls communication between said respective cylinders and the outlet passage 112.

Pistons 114 and 116 are reciprocally mounted in the cylinders 90 and 92 and are connected by means of the spaced facing racks 118 and 120, the racks being provided with teeth 122 adapted to have cooperative engagement with the teeth of the mutilated gear 124, the racks 126 and 127 of the other pair of cylinders having similar cooperation with the teeth of the mutilated gear 128. The mutilated gears are set 90° apart and are mounted on the shaft 130 journalled in the casing as at 132 and 134, said shaft being suitably mounted on anti-friction bearings and suitable stuffing boxes 136 and 138 being provided for preventing leakage through the casing. The mutilated gears 124 and 128 are each provided with a valve moving cam as well as one of the cams 146, these cams being adjustably mounted with respect to their associated mutilated gears by means of one or more screws 143, sufficient clearance in the openings of the gears for receiving said screws being provided to permit said adjustments. Each piston is provided with a roller 144 mounted inwardly of the piston and adapted to engage the cam 146 near the end of the piston stroke, the roller preferably being mounted directly on the end pieces of the racks.

In order to reciprocate the valve 100, the valve operating bell crank 148 is provided pivotally mounted to the casing as at 150 and loosely engaging the valve as at 152 between the spaced flanges 154. The other leg of the bell crank is provided with the roller 156 having cooperative engagement with the valve moving cam 140. A similar construction is provided through the valve operating bell crank 158 provided for the other set of cylinders. The bevel gear 160 is mounted on the shaft 130 and meshes with the bevel gear 162 mounted on the registering shaft 164 journalled as at 166 and 168 in the housing, said shaft being adapted to operate the meter shaft 66. Suitable stuffing boxes 170 are provided to prevent leakage of the liquid within the casing and outwardly of the valve casing.

In operation of the liquid dispensing apparatus, assuming that the registering device is set at zero, it is only necessary to remove the nozzle from the support and move the switch arm upwardly to cause the link 78 to close the switch 74. Operation of the motor will cause the pump to supply the liquid from the source of supply 46 through the pipe 50 to the meter 48, introducing said liquid through the passage 96. The liquid enters the valve chamber and is forced to the cylinders through the ports 106 or 108, depending upon which port is open, through the action of the respective valves 100 and 102.

In the construction shown in Figure 2, the valve 100 has already started on its movement to the left as viewed in this figure, causing opening of the port 106 and entrance of the liquid from the valve or inlet chamber 98 to the passage 106. At the same time the valve has already closed the inlet port 108 to entrance of the liquid from the inlet chamber but has opened communication between the channel 108 and the outlet port 110. As the liquid is forced into the cylinder 90 it causes the pistons 114 and 116 to be moved toward the left as viewed in Figure 2, whereby the liquid in cylinder 92 will be discharged through the channel 108, the outlet port 110, and the outlet 112 to the pipe 54 and thence through the sight gauge 56, the hose 58 and the nozzle 60, assuming the nozzle valve to be open.

Opposite movement of the pistons causes dispensing of the liquid from the cylinder 90. Movement of the pistons toward the left as viewed in Figure 2 causes the teeth to engage the mutilated gear 124, the teeth being so arranged that when the lower rack is moving the gear in a clockwise direction as shown by the arrow, the upper rack 120 is idling over the toothless portion of the gear. When the rack and pistons have reached the extreme limit of their movement toward the left and are ready to start their reverse movement back toward the right, the teeth on the gear have moved around the arc until the leading tooth of the gear is in a position to be engaged by the first tooth of the upper rack 120, and thereby continual circular movement of the gear is accomplished.

The cam 140 is provided for movement of the valve 100 through the roller 156 travelling in the cam slot, and the bell crank 148, while the cam 146 is provided to act as a stop to limit the length of the piston travel and to prevent any uncontrolled movement of the piston while the mutilated gear is out of mesh with the racks as shown in Figure 2. The cam raceway of the cam 146 is designed so that as the last gear tooth is leaving the rack the raceway engages the rollers 144 of the piston or rack and retards the piston movement, bringing it to a complete stop as the central portion of the raceway reaches the roller, this position being shown in Figure 2. As the cam 146 continues its rotating movement around the shaft 130, the following portion of the raceway through pressure against the roller 144 gradually starts the pistons on the return movement so that as the leading tooth of the mutilated gear engages the teeth of the rack there is no shock due to sudden acceleration of the piston.

In the cam designed as the cam 146 engages the roller 144, the rack and gear teeth are disengaging, but the cam groove continues the retarding movement of the rack until the central portion of the groove reaches the roller. The movement of the rack and pinion is then completely stopped. As the mutilated gear and cam 146 continue the following portion of the cam 146 forces the roller out of the cam groove with a gradually accelerated movement so that the racks and piston are travelling at full speed as the rack and mutilated gear engage. The movement at each end of the piston stroke is of course the same.

As this operation is taking place at the roller 144, the cam 140 moves the roller 156 on the bell crank to the outer part of the cam race and completes the valve movement of the valve 100 to full open position. As the pistons approach the left limit as viewed in Figure 2, the cam 146 halts the movement of the pistons and the cam 140 is so located as to have moved the valve 100 toward central position so that the port 106 is almost closed to intake. The other pair of pistons being operable 90° in advance, now functions to operate in a manner already described, performing the work of driving the shaft 130. As the dubbed tooth of gear 124 moves out of engagement with the lower rack, the cam 140 moves the valve 100 across closed position and slightly opens port 108 to intake position and opens port 106 to discharge through the port 110, this partial valve movement being completed slightly before the gear tooth on the mutilated gear 124 engages the top rack. Engagement of the cam 146 with the rollers 144 insures the proper meshing of the gear and rack teeth at the beginning of each stroke, and also prevents any travel of the piston during the interval the teeth of the mutilated gear are not in mesh with the rack.

In order to provide for calibration of the device, a construction such as shown in Figure 5 may be used. The adjusting screw 172 is mounted in the casing and is adapted to move the lever 174 pivotally mounted as at 176, the upper end of the lever being adapted to be engaged by the lever 178 pivotally mounted as at 180 on one of the pistons or racks, as for example rack 120 of Figure 2. The lever 178 is provided with the seat 182 adapted to contact the member 184 for slidably moving the movable portion 186 of said piston whereby the piston travel can be decreased or enlarged by moving the portion 186 of the piston away from the fixed portion 187 thereof.

Referring now to the construction illustrated in Figures 6 and 7, a construction is shown wherein the racks are directly supported by the meter casing thus relieving the cylinder walls from the support of the racks and the stresses incident to the operation of the pistons. The arrangements of the cylinders in the meter, of course, are similar to that already described. In this case the meter casing 88 is provided with the reciprocating cylinders, pairs of said cylinders being connected by means of the spaced facing racks 118 and 120 and the adjacent racks 126, the racks being adapted to be operated by means of the mutilated gears 124 and 128, respectively. The valve moving cams 140 and 142 being mounted on the shaft 130, the shaft being journalled in the casing as at 132 and 134, anti-friction bearings being provided and suitable seal rings 136 and 138 being disposed adjacent the journal of the shaft for preventing leakage to the anti-friction bearings. The anti-friction bearings are retained in the housings 188 by means of the nut 190 threaded therein. The end caps 192 likewise being threaded into position to close the lubricant recess 194 formed in the casing, the housings 188 are provided with the spaced inwardly extending arms 196 provided with the tracks 198 supportingly engaging the racks 118, 120 and 126 whereby the weight of the racks is removed from the cylinder walls.

It is to be understood that we do not wish to be limited by the exact embodiment of the device shown, which is merely by way of illustration and not limitation, as various and other forms of the device will, of course, be apparent to those skilled in the art without departing from the spirit of the invention or the scope of the claims.

We claim:

1. In a meter, the combination of a casing having opposed cylinders, a valve chamber, an inlet to said chamber, a cylinder passage extending from said chamber to one end of each of said cylinders, an outlet passage communicating with said chamber, a valve slidably mounted in said chamber for controlling communication between said chamber and said cylinder passages, and between said cylinder passages and said outlet passage, pistons mounted in said cylinders, spaced racks connecting said pistons, a shaft disposed between said racks, a mutilated gear mounted on said shaft, cams disposed on said shaft adjacent said gear, a roller mounted on each of said pistons and engageable with one of said cams, and means disposed between the other of said cams and said valve for operating said valve, said racks controlling movement of said mutilated gear.

2. In a meter, the combination of a casing having opposed cylinders, a valve chamber, an inlet to said chamber, a cylinder passage extending from said chamber to one end of each of said cylinders, an outlet passage communicating with said chamber, a valve slidably mounted in said chamber for controlling communication between said chamber and said cylinder passages, and between said cylinder passages and said outlet passage, pistons mounted in said cylinders, spaced racks connecting said pistons, a shaft disposed between said racks, a mutilated gear mounted on said shaft and successively engageable with said racks for rotating said shaft, cams mounted on said shaft adjacent said gear, a roller mounted on each of said pistons and engageable with one of said cams whereby said cam moves said pistons to approximate movement of said gear to effect proper engagement between said racks and said gear, and means disposed between the other of said cams and said valve whereby movement of said pistons controls movement of said valve to control discharge from one of said cylinders and supply to the other of said cylinders.

3. In a meter, the combination of a casing having opposed cylinders, a valve chamber, an inlet to said chamber, a cylinder passage extending from said chamber to one end of each of said cylinders, an outlet passage communicating with said chamber, a valve mounted in said chamber for controlling communication between said chamber and said cylinder passages, and between said cylinder passages and said outlet passage, pistons mounted in said cylinders, spaced racks connecting said pistons, a shaft disposed between said racks, a mutilated gear mounted on said shaft and successively engageable with said racks for rotating said shaft, cams mounted on said shaft adjacent said gear, a roller mounted on each of said pistons and engageable with one of said cams whereby said cam moves said pistons to approximate movement of said gear to effect proper engagement between said racks and said gear, and means operatively associated with the other of said cams for operating said valve.

4. In a meter, the combination of a casing having opposed cylinders, a valve chamber, an inlet to said chamber, a cylinder passage extending from said chamber to one end of each of said cylinders, an outlet passage communicating with said chamber, a valve mounted in said chamber for controlling communication between said chamber and said cylinder passages, and between said cylinder passages and said outlet passage, pistons mounted in said cylinders, spaced racks connecting said pistons, a shaft disposed between said racks, a mutilated gear mounted on said shaft and successively engageable with said racks for rotating said shaft, cams mounted on said shaft adjacent said gear, a roller mounted on each of said pistons and engageable with one of said cams whereby said cam moves said pistons to approximate movement of said gear to effect proper engagement between said racks and said gear, and means disposed between the other of said cams and said valve whereby movement of said pistons controls movement of said valve to control discharge from one of said cylinders and supply to the other of said cylinders.

5. In a meter, the combination of a casing having a pair of opposed cylinders, a valve chamber, an inlet to said chamber, a cylinder passage extending from said chamber to one end of each of said cylinders, outlet passages communicating with said chamber and disposed between each of said opposed cylinders, valves mounted in said chamber for controlling communication between said chamber and each of said cylinder passages, and between said cylinder passages and the associated outlet passages, pistons mounted in said cylinders, spaced racks connecting pairs of said pistons, a shaft disposed between said racks, an indicating shaft operated by said shaft, mutilated gears mounted on said first named shaft between each pair of opposed pistons, cams disposed on said shaft adjacent each of said mutilated gears, a roller mounted on each of said pistons and engageable with one of said cams, and means disposed between others of said cams and each of said valves for operating said valves, said racks controlling movement of each of said mutilated gears.

6. In a meter, the combination of a casing having a pair of opposed cylinders, a valve chamber, an inlet to said chamber, a cylinder passage extending from said chamber to one end of each of said cylinders, outlet passages communicating with said chamber and disposed between each of said opposed cylinders, valves mounted in said chamber for controlling communication between said chamber and each of said cylinder passages, and between said cylinder passages and the associated outlet passages, pistons mounted in said cylinders, spaced racks connecting pairs of said pistons, a shaft disposed between said racks, an indicating shaft operated by said shaft, mutilated gears mounted on said first named shaft between each pair of opposed pistons, cams disposed on said shaft adjacent each of said multilated gears, a roller mounted on each of said pistons and engageable with one of said cams, and means disposed between others of said cams and each of said valves for operating said valves, said racks controlling movement of each of said mutilated gears, said mutilated gears being set at a pre-determined angle to each other.

7. In a meter, the combination of a casing having a pair of opposed cylinders, a valve chamber, an inlet to said chamber, a cylinder passage extending from said chamber to one end of each of said cylinders, outlet passages communicating with said chamber and disposed between each of said opposed cylinders, valves mounted in said chamber for controlling communication between said chamber and each of said cylinder passages, and between said cylinder passages and the associated outlet passages, pistons mounted in said cylinders, spaced racks connecting pairs of said pistons, a shaft disposed between said racks, an indicating shaft operated by said shaft, mutilated gears mounted on said first named shaft between each pair of opposed pistons, cams disposed on said shaft adjacent each of said mutilated gears, a roller mounted on each of said pistons and engageable with one of said cams, and means disposed between others of said cams and each of said valves for operating said valves, said racks controlling movement of each of said mutilated gears, said mutilated gears being set ninety degrees apart.

8. In a meter, the combination of a casing having an inlet and an outlet, oppositely disposed cylinders in said casing, a piston in each of said cylinders and connected together by spaced racks and adapted to be reciprocated by fluid introduced into said cylinders, valve means operated by said pistons for controlling the flow of fluid from said inlet to said cylinders and from cylinders to said outlet, and means operated by movement of said pistons for indicating quantities of fluid dispensed from said cylinders, said means including a mutilated gear meshing alternately with said racks.

9. In a meter, the combination of a casing having an inlet and an outlet, oppositely disposed cylinders in said casing, a piston in each of said cylinders and connected together by spaced racks and adapted to be reciprocated by fluid introduced into said cylinders, valve means for controlling the flow of fluid from said inlet to said cylinders and from said cylinders to said outlet, means operated by movement of said pistons for indicating quantities of fluid dispensed from said cylinders, said means including a mutilated gear meshing alternately with said racks, and means operated by said last-named means for operating said valve means.

10. In a meter, the combination of a casing having an inlet and an outlet, pairs of aligned cylinders disposed in said casing, opposed pistons disposed in each pair of aligned cylinders and connected together by spaced racks to be reciprocated as a unit by fluid introduced into said cylinders whereby when one of said opposed cylinders is discharging the other is being supplied, valve means operated by said pistons for controlling the flow of fluid into and out of said cylinders, means operated by movement of said pistons for indicating quantities of fluid dispensed from said cylinders, said means including a mutilated gear disposed in each pair of said cylinders and meshing alternately with said racks.

11. In a meter, the combination of a casing having an inlet and an outlet, pairs of aligned cylinders disposed in said casing, opposed pistons disposed in each pair of aligned cylinders and connected together by spaced racks to be reciprocated as a unit by fluid introduced into said cylinders whereby when one of said opposed cylinders is discharging the other is being supplied, valve means operated by said pistons for controlling the flow of fluid into and out of said cylinders, means operated by movement of said pistons for indicating quantities of fluid dispensed from said cylinders, said means including a mutilated gear disposed in each pair of said cylinders and meshing alternately with said racks, and cam means associated with each of said mutilated gears and each being operated by movement of the mutilated gear in the other pair of cylinders for initially moving the opposed pistons in that pair of cylinders prior to engagement of the mutilated gear with a rack to complete the stroke of the pistons.

ROBERT J. JAUCH.
ROSS H. ARNOLD.